United States Patent

Nomaru et al.

[11] Patent Number: 5,166,874
[45] Date of Patent: Nov. 24, 1992

[54] METHOD AND APPARATUS FOR PRODUCTION LINE FAULT MANAGEMENT

[75] Inventors: Minoru Nomaru, Yokohama; Tohru Nishiyama, Ayase; Hiroyuki Kanno, Zama, all of Japan

[73] Assignee: Nissan Motor Co. Ltd., Yokohama, Japan

[21] Appl. No.: 509,446

[22] Filed: Apr. 16, 1990

[30] Foreign Application Priority Data

Apr. 27, 1989 [JP] Japan .................................. 1-105809

[51] Int. Cl.⁵ ................................................ G05B 9/02
[52] U.S. Cl. .................................... 364/184; 364/468
[58] Field of Search ............... 364/183, 184, 187, 468, 364/470, 478, 474.15, 474.16; 371/29.1; 29/407; 228/102

[56] References Cited

U.S. PATENT DOCUMENTS

| | | | |
|---|---|---|---|
| 4,413,738 | 11/1983 | Pemberton et al. | |
| 4,521,847 | 6/1985 | Ziehm et al. | 364/184 |
| 4,542,479 | 9/1985 | Kamimura et al. | 364/184 |
| 4,564,102 | 1/1986 | Mori et al. | 364/478 |
| 4,638,227 | 1/1987 | Katayama et al. | 364/184 |
| 4,827,423 | 5/1989 | Beasley et al. | 364/468 |
| 4,835,699 | 5/1989 | Mallard | 364/470 |
| 4,858,102 | 8/1989 | Lovrenich | 364/184 |
| 4,981,252 | 1/1991 | Yazaki et al. | 228/102 |
| 4,992,928 | 2/1991 | Ishihara et al. | 364/184 |
| 5,005,277 | 4/1991 | Uemura et al. | 29/407 |
| 5,008,805 | 4/1991 | Fiebig et al. | 364/184 |

FOREIGN PATENT DOCUMENTS

| | | |
|---|---|---|
| 2714069 | 10/1977 | Fed. Rep. of Germany . |
| 3208881 | 8/1986 | Fed. Rep. of Germany . |
| 260351 | 9/1988 | Fed. Rep. of Germany . |
| 1-153387 | 6/1989 | Japan . |
| 1-311969 | 12/1989 | Japan . |

Primary Examiner—Jerry Smith
Assistant Examiner—Jim Trammell
Attorney, Agent, or Firm—Pennie & Edmonds

[57] ABSTRACT

A method and apparatus controlling a production line including at least one work station operable in one of a normal production posture and at least one extraordinary production posture for producing products and a checking station located downstream of the work station for making a quality check to provide a quality audit result for each of the products transferred in succession from the work station. Trouble data are provided in succession for respective troubles which have occurred in the work station. The trouble data are accumulated to provide trouble history data specifying each of the troubles in relation to a nature of the corresponding trouble, a cause of the corresponding trouble, and a stoppage time required to restore the work station so as to remove the corresponding trouble. A failure signal is produced when the work station ceases to function due to a trouble. The failure signal indicates detected nature and cause of the trouble. A stoppage time is estimated from the trouble history data based on the detected trouble nature and cause when the failure signal occurs. A first command is produced to restore the work station when the estimated stoppage time is less than a predetermined time. Alternatively, a second command is produced to place the work station into the extraordinary production posture when the estimated stoppage time exceeds a predetermined value.

26 Claims, 15 Drawing Sheets

FIG.3

| PRODUCTION PLAN VEHICLE BODY ASSEMBLING | DOMESTIC /ABROAD | MISSION | COLOR | SUSPENSION |
|---|---|---|---|---|
| CODE | | | | |
| X 07 RGH | DOMESTIC | 4 AT | 004 | |
| V 09 WKDR | NORTH AMERICA | 5 MT | 100 | |
| D 78 ERTU | EUROPE | 5 MT | 311 | |
| • • • • • • | | | | |

DATE 89-4-01 (PRODUCTION PLAN PAINTING)

DATE 89-4-01 (PRODUCTION PLAN VEHICLE ASSEMBLING)

| ACTUAL OUTPUT | VEHICLE BODY ASSEMBLING | | | | SUSPENSION |
|---|---|---|---|---|---|
| CODE | DOMESTIC /ABROAD | MISSION | COLOR | | |
| X 07 RGH | DOMESTIC | 4 AT | 004 | | |
| V 09 WKDR | NORTH AMERICA | 5 MT | 100 | | |
| D 78 ERTU | EUROPE | 5 MT | 311 | | |
| • • • • • • | | | | | |

DATE 89-4-01 — ACTUAL OUTPUT PAINTING
DATE 89-4-01 — ACTUAL OUTPUT VEHICLE ASSEMBLING
DATE 89-4-01

| WORKING TIME | VEHICLE BODY ASSEMBLING | | FLOOR MAIN SUB-LINE | | | | | |
| --- | --- | --- | --- | --- | --- | --- | --- | --- |
| WORKING TIME | VEHICLE BODY ASSEMBLING | | BODY SIDE SUB-LINE | | | | | |
| WORKING TIME | VEHICLE BODY ASSEMBLING | | BODY MAIN LINE | | | | | |
| | | | TYPE 1 (SEDAN) | | | KIND 2 (HATCH BACK) | | ... |
| STATION NO. | WORK | | NORMAL | SLOW-SPEED | SUBSTITUTE | NORMAL | SLOW-SPEED | SUBSTITUTE |
| #10 | FLOOR MAIN TRANSFER | | 34 SEC. | NIL | NIL | 34 SEC. | NIL | NIL |
| #20 | BODY SIDE TRANSFER | | 45 SEC. | NIL | NIL | 45 SEC. | NIL | NIL |
| #30 | BODY MAIN TACK WELDING | | 52 SEC. | 75 SEC. | 105 SEC. | 50 SEC. | 70 SEC. | 98 SEC. |
| #40 | POSITION ERROR MEASUREMENT | | 52 SEC. | • | • | 50 SEC. | • | • |
| #50 | VEHICLE BODY SPOT WELDING | | 51 SEC. | • | • | 48 SEC. | • | • |
| #60 | BODY MAIN OUTPUT | | 30 SEC. | • | • | 30 SEC. | • | • |
| LINE TACT | | | 52 SEC. | 75 SEC. | 105 SEC. | 50 SEC. | 70 SEC. | 98 SEC. |

| QUALITY AUDIT | VEHICLE BODY ASSEMBLING | ASSEMBLING ERROR | PART | FLOOR MAIN |
| --- | --- | --- | --- | --- |

| QUALITY AUDIT | VEHICLE BODY ASSEMBLING | ASSEMBLING ERROR | PART | BODY SIDE |
| --- | --- | --- | --- | --- |

| QUALITY AUDIT | VEHICLE BODY ASSEMBLING | | ASSEMBLING ERROR | | | PART | ENGINE COMPARTMENT | |
| --- | --- | --- | --- | --- | --- | --- | --- | --- |
| BODY NO. | SENSOR NO. | X | Y | Z | TIME | | | |
| X 078920 | 1 | -0.01 | -0.01 | 0.08 | 89-4-01 14:07 | | | |
| | 2 | 0.3 | -0.2 | 0.13 | | | | |
| | 3 | 0.04 | -0.01 | 0.05 | | | | |
| V 093267 | ..... | | | | | | | |
| D 782390 | | | | | | | | |

| TROUBLE HISTORY | VEHICLE BODY ASSEMBLING | FLOOR MAIN SUB-LINE |
| --- | --- | --- |

| TROUBLE HISTORY | VEHICLE BODY ASSEMBLING | BODY SIDE SUB-LINE |
| --- | --- | --- |

| TROUBLE HISTORY | VEHICLE BODY ASSEMBLING | BODY MAIN LINE |
| --- | --- | --- |

| STATION NO. | NATURE | TIME | STOPPAGE TIME | RESTORATION | CAUSE |
| --- | --- | --- | --- | --- | --- |
| #30 | POSITIONING ROBOT BL3, 4TH AXIS MOTOR OVERHEAT | 89-4-1 23:10 | 20MIN | EXCHANGE OF MOTOR | OVERLOAD |
| #30 | POSITIONING ROBOT BL2, 1ST AXIS MOTOR OVERHEAT | | 10MIN | EXCHANGE OF SERVO AMP. | DAMAGE TO SERVO AMP. |
| #30 | POSITIONING ROBOT BL1, 3RD AXIS MOTOR OVERHEAT | | 120MIN | EXCHANGE OF BALL SCREW | DAMAGE TO BALL SCREW |
| ..... | | | | | |

FIG. 8

| NO. | MEASURING UNIT | STATION NO. |
|---|---|---|
| 1 | ASSEMBLING ERROR MEASURING UNIT IN FLOOR MAIN SUB-LINE | ENGINE COMPARTMENT SUB-LINE #10<br>FLOAT FLOOR SUB-LINE #10<br>REAR FLOOR SUB-LINE #10<br>FLOOR MAIN LINE #20 |
| 2 | ASSEMBLING ERROR MEASURING UNIT IN LEFT BODY SIDE SUB-LINE | LEFT BODY SIDE SUB-LINE #20 |
| 3 | ASSEMBLING ERROR MEASURING UNIT IN RIGHT BODY SIDE SUB-LINE | RIGHT BODY SIDE SUB-LINE #20 |
| 4 | ASSEMBLING ERROR MEASURING UNIT IN BODY MAIN LINE | BODY MAIN LINE #30 |

36

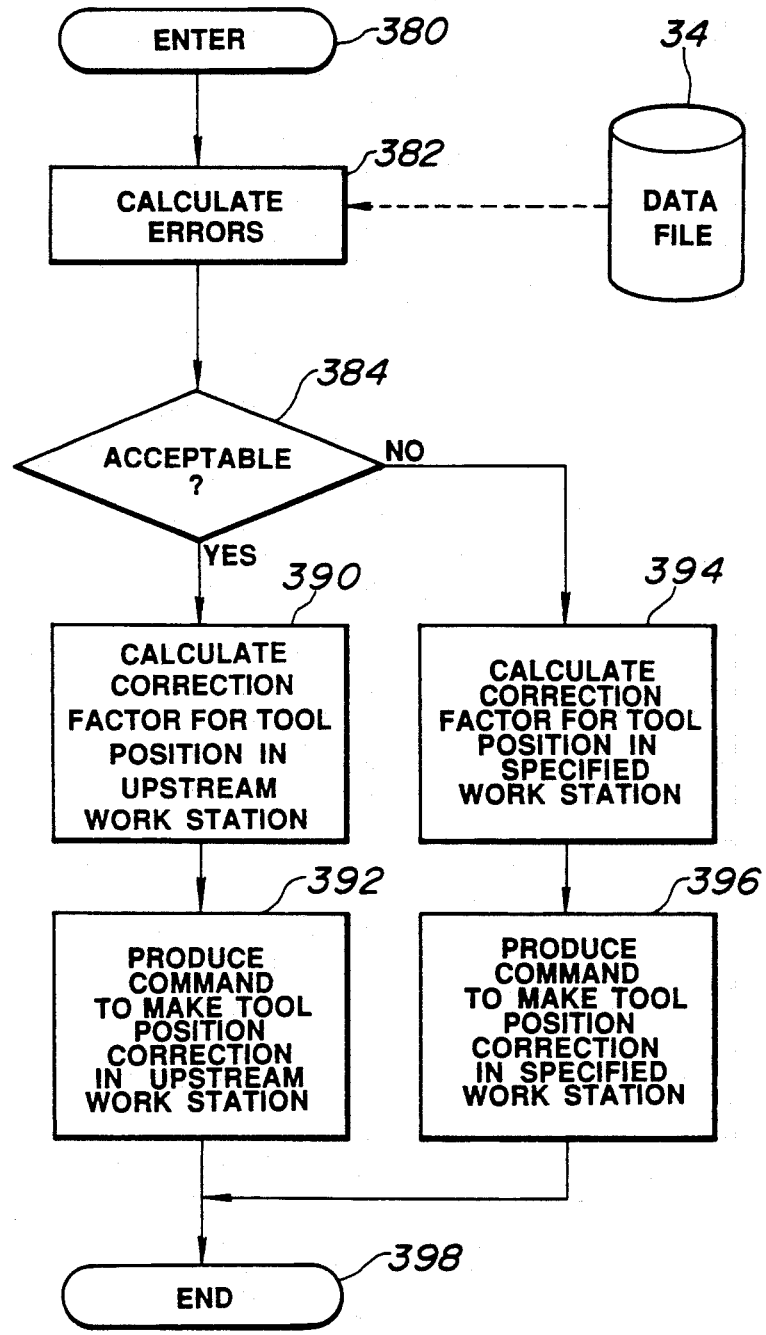

METHOD AND APPARATUS FOR PRODUCTION LINE FAULT MANAGEMENT

BACKGROUND OF THE INVENTION

This invention relates to a method and apparatus for controlling a production line.

Normal production lines include at least one work station for producing products and a quality checking station located downstream of the work station for making a quality check for each of the products transferred in succession from the work station to provide a quality check result therefor. When the work station ceases to function due to a trouble, the work station is restored or placed in an extraordinary production posture. This selection has been made based on operator's experience and perception which may lead to an improper selection resulting in an unnecessary production efficiency reduction.

SUMMARY OF THE INVENTION

It is a main object of the invention to provide a production line control method and apparatus which can minimize the production efficiency reduction resulting from a trouble in the production line.

There is provided, in accordance with the invention, a method of controlling a production line including at least one work station operable in one of a normal production posture and at least one extraordinary production posture for producing products and a checking station located downstream of the work station for making a quality check to provide a quality audit result for each of the products transferred in succession from the work station. The method comprises the steps of accumulating trouble data provided in succession for respective troubles which have occurred in the work station to provide trouble history data specifying each of the troubles in relation to a nature of the corresponding trouble, a cause of the corresponding trouble, and a stoppage time required to restore the work station so as to remove the corresponding trouble, producing a failure signal when the work station ceases to function due to a trouble, the failure signal indicating detected nature and cause of the trouble, referring to the trouble history data to estimate a stoppage time based on the detected trouble nature and cause in response to the failure signal, producing a first command to restore the work station when the estimated stoppage time is less than a predetermined time, and producing a second command to place the work station into the extraordinary production posture when the estimated stoppage time exceeds a predetermined value.

In another aspect of the invention, there is provided an apparatus for controlling a production line including at least one work station operable in one of a normal production posture and at least one extraordinary production posture for producing products and a checking station located downstream of the work station for making a quality check to provide a quality audit result for each of the products transferred in succession from the work station. The apparatus comprises means for accumulating trouble data provided in succession for respective troubles which have occurred in the work station to provide trouble history data specifying each of the troubles in relation to a nature of the corresponding trouble, a cause of the corresponding trouble, and a stoppage time required to restore the work station so as to remove the corresponding trouble, means for producing a failure signal when the work station ceases to function due to a trouble, the failure signal indicating detected nature and cause of the trouble, and a control unit including means responsive to the failure signal for referring to the trouble history data to estimate a stoppage time based on the detected trouble nature and cause, means for producing a first command to restore the work station when the estimated stoppage time is less than a predetermined time, and means for producing a second command to place the work station into the extraordinary production posture when the estimated stoppage time exceeds a predetermined value.

BRIEF DESCRIPTION OF THE DRAWINGS

This invention will be described in greater detail by reference to the following description taken in connection with the accompanying drawings, in which:

FIG. 3 is a diagram showing one example of a production plan data file used in the production line control apparatus;

FIG. 4 is a diagram showing one example of a actual output data file used in the production line control apparatus;

FIG. 5 is a diagram showing one example of a working time data file used in the production line control apparatus;

FIG. 6 is a diagram showing one example of a quality audit result data used in the production line control apparatus;

FIG. 7 is a diagram showing one example of a trouble history data file used in the production line control apparatus;

FIG. 8 is a diagram showing one example of a measuring unit/work station correspondence data file used in the production line control apparatus;

FIG. 15 is a detailed flow diagram illustrating the programming of the host computer as it is used to select a correction work for a positioning tool used in the work station.

DETAILED DESCRIPTION OF THE INVENTION

Figure 1:
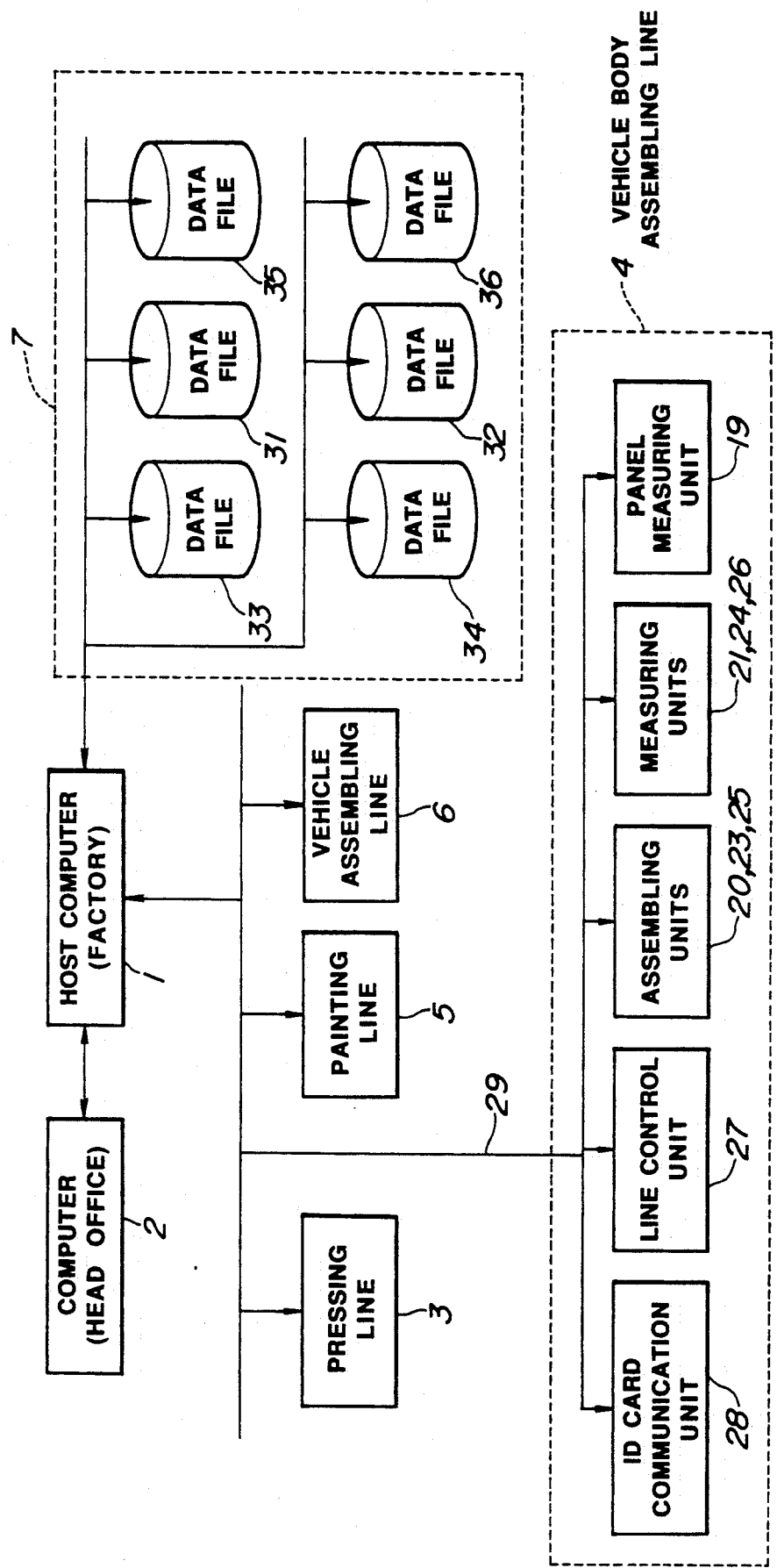
FIG. 1 is a schematic block diagram of a production line control apparatus made in accordance with the invention.

With reference to the drawings, where like numerals refer to like parts in the several views, and in particular to FIG. 1, there is shown a schematic block diagram of a production line control apparatus embodying the method and apparatus of the invention. Although this invention may be applied to an automotive vehicle production line, it should be understood that the principles and approaches taken in connection with this particular production line are applicable to other production lines as well.

The production line control apparatus is shown as including a host computer 1 installed in a factory and communicating with a computer 2 installed in the head office for controlling an automotive vehicle production line arranged for multi-type production of automotive vehicles. The production line includes a pressing line 3 for producing panels from steel strip, a vehicle body assembling line 4 for jointing the panels to assemble a vehicle body, a painting line 5 for coating the assembled vehicle body with a paint, and a vehicle assembling line 6 for combining seats and other fittings with the assembled vehicle body to assemble an automotive vehicle.

Figure 2:
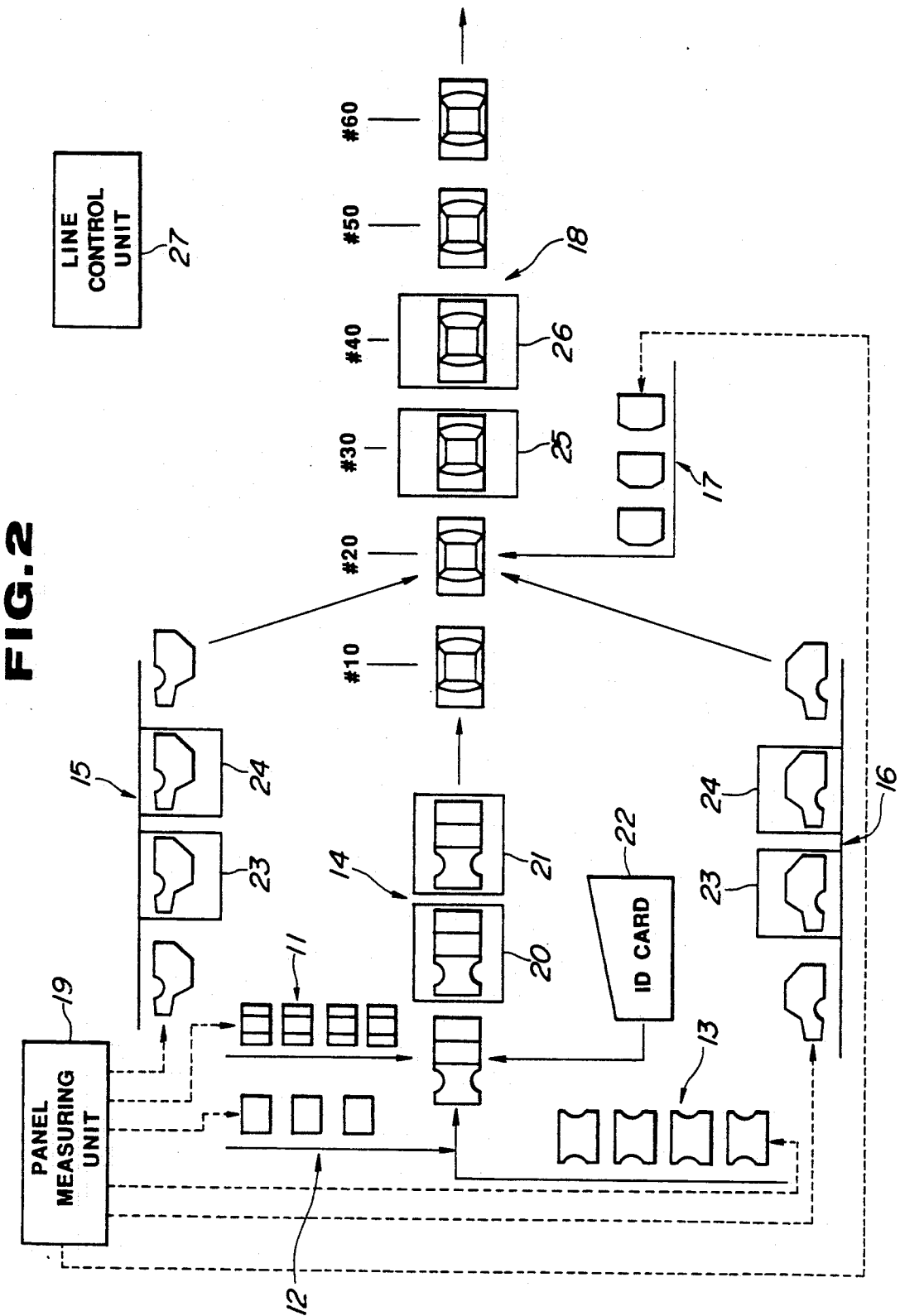
FIG. 2 is a schematic block diagram of a production line to which the invention is applicable.

Referring to FIG. 2, the vehicle body assembling line 4 includes various sub-lines 11–17 for producing various vehicle parts and a main line 18 for combining the vehicle parts transferred thereto from the sub-lines to assemble an automotive vehicle. The sub-lines includes an engine compartment sub-line 11, a front floor sub-line 12, a rear floor sub-line 13, a floor main sub-line 14, a left body side sub-line 15, a right body side sub-line 16, a roof sub-line 17, a body main sub-line, and other unillustrated sub-lines including a cowl top sub-line, a rear shelf sub-line and a rear panel sub-line. The engine compartment sub-line 11 includes an assembling station which positions and joins engine compartment components transferred thereinto to assemble an engine compartment. A panel measuring unit 19, which may be of the type disclosed in Japanese Patent Application No. 62-313023, measures the dimensions and shapes of the respective engine compartment components (panels) to be transferred into the assembling station and compares the measured dimensions and shapes with the corresponding normal dimensions and sizes specified by the computer aided design (CAD) data obtained when the vehicle body is designed to provide quality audit result data including dimension and shape errors for the respective engine compartment components. The quality audit result data are transferred from the panel measuring unit 19 to the host computer 1. Similarly, the front floor sub-line 12 includes an assembling station which positions and joins front floor components transferred therein to assemble a front floor. The panel measuring unit 19 measures the dimensions and shapes of the respective front floor components (panels) to be transferred into the assembling station and compares the measured dimensions and sizes with the corresponding normal dimensions and sizes specified by the CAD data to provide quality audit result data including dimension and size errors for the respective front floor components. The quality audit result data are transferred from the panel measuring unit 19 to the host computer 1. Likewise, the rear floor sub-line 13 includes an assembling station which positions and joins rear floor components transferred thereinto to assemble a rear floor. The panel measuring unit 19 measures the dimensions and shapes of the respective rear floor components (panels) to be transferred into the assembling station and compares the measured dimensions and sizes with the corresponding normal dimensions and sizes to provide quality audit result data including dimension and size errors for the respective rear floor components. The quality audit result data are transferred from the panel measuring unit 19 to the host computer 1.

The floor main sub-line 14 includes a transfer station into which the floor main components including the engine compartment, the front floor and the rear floor are transferred from the respective sub-lines therefor. An identification (ID) card 22 is attached to the engine compartment transferred into the transfer station. The ID card 22 has an identification code stored therein, the identification code specifying a floor main to be assembled with the engine compartment and a vehicle body to be assembled with the specified floor main. The floor main sub-line 14 also includes an assembling station which employs a floor main assembling unit 20 to position the floor main components transferred thereinto from the transfer station and join the positioned floor main components by spot welding to assemble a floor main. The floor main assembling unit 20 may be of the type employing a number of manipulator arms as disclosed in Japanese Patent Application Nos. 62-313023 and 63-143478. The floor main assembling unit 20 has an additional function of producing a failure signal to the host computer 1 when the floor main assembling station ceases to function due to a trouble. The assembled floor main is then transferred from the assembling station into a position measuring station which employs a position measuring unit 21 to measure positions of respective measuring points set on the assembled floor main and compares the measured positions with the corresponding normal positions specified by the CAD data to provide quality audit result data including position errors for the respective measuring points. The quality audit result data are stored in the ID card 22 and transferred through the position measuring unit 21 to the host computer 1. The position measuring unit 21 may be generally the same as disclosed in Japanese Patent Application No. 62-313023. The flow main is then transferred from the measuring station to a floor main transfer station #10.

The left body side sub-line 15 includes an assembling station which employs an assembling unit 23 to position the left body side components transferred thereinto and join the positioned left body side components by spot welding to assemble a left body side. The assembling unit 23 may be generally the same as disclosed in Japanese Patent Application Nos. 62-313023 and 63-143478. The assembling unit 23 has an additional function of producing a failure signal to the host computer 1 when the left body side assembling station ceases to function due to a trouble. The panel measuring unit 19 measures the dimensions and shapes of the respective left body side components to be transferred into the assembling station and compares the measured dimensions and sizes with the corresponding normal dimensions and sizes specified by the CAD data to provide quality audit result data including dimension and size errors for the respective left body side components. The quality audit result data are transferred from the panel measuring unit 19 to the host computer 1. The assembled left body side is then transferred from the assembling station into a position measuring station which employs a position measuring unit 24 to measure the positions of respective measuring points set on the assembled left body side and compare the measured positions with the corresponding normal positions specified by the CAD data to provide quality audit result data including position errors for the respective measuring points. The position measuring unit 24 may be generally the same as disclosed in Japanese Patent Application No. 62-313023. Similarly, the right body side sub-line 16 includes an assembling station which employs an assembling unit 23 to position the right body side components transferred thereinto and join the positioned right body side components by spot welding to assemble a right body side. The panel measuring unit 19 is used to measure the dimensions and shapes of the respective right body side components (panels) to be transferred into the assembling station and compare the measured dimensions and sizes with the corresponding normal dimensions and sizes specified by the CAD data to provide quality audit result data including dimension and size errors for the respective right body side components. The quality audit result data are transmitted from the panel measuring unit 19 to the host computer 1. The assembled right body side is then transferred from the assembling station into a position measuring station which employs a position measuring unit 24 to measure the positions of respective measuring points set on the assembled right body and compare the measured positions with the corresponding normal positions specified by the CAD data to provide quality audit result data including position errors for the respective measuring points. The roof sub-line 17 includes an assembling station which positions and joins roof components transferred thereinto to assemble a roof. The panel measuring unit 19 measures the dimensions and shapes of the respective roof components (panels) to be transferred into the assembling station and compares the measured dimensions and shapes with the corresponding normal dimensions and shapes specified by the CAD data to provide quality audit result data including dimension and shape errors for the respective roof components. The quality audit result data are transferred from the panel measuring unit 19 to the host computer 1. Similar operations are made for the other vehicle body parts including a cowl top, a rear shelf and a rear panel.

The main line 18 includes a transfer station #20 into which the floor main, the left body side, the right body side, the roof, the cowl top, the rear shelf and the rear panel are transferred from their respective sub-lines. These vehicle body parts are transferred into a tack welding station #30 which employs an assembling unit 25 to position the transferred vehicle body parts and join the positioned vehicle body parts by spot welding to assemble a vehicle body. The assembling unit 25 may be generally the same as disclosed in Japanese Patent Application Nos. 62-313023 and 63-143478. The assembling unit 25 has an additional function of producing a failure signal to the host computer 1 when the tack welding station #30 ceases to function due to a trouble. The assembled vehicle body is then transferred from the tack welding station #30 to a measuring station #40 which employs a position measuring unit 26 to measure the positions of respective measuring points set on the vehicle body and compare the measured position with the corresponding normal positions specified by the CAD data to provide quality audit result data including position errors for the respective measuring points. The quality audit result data are stored in the ID card 22 and transferred through position measuring unit 26 to the host computer 1. The position measuring unit 26 may be the same as disclosed in Japanese Patent Application No. 62-313023. Thereafter, the vehicle body is transferred from the measuring section to another work station #50 where the intensity of the vehicle body is increased to a sufficient extent by spot welding and then to an output station #60. The numeral 27 designates a line control unit for controlling the operation of the stations provided in the sub- and main-lines. The line control unit 27 has an additional function of producing a failure signal to the host computer 1 when at least one of the work stations located on the vehicle body assembling line 4 ceases to function due to a trouble.

Returning to FIG. 1, the host computer 1 communicates with the ID card communication unit 28, the line control unit 27, the assembling units 20, 23 and 25, the position measuring units 21, 24 and 26, and the panel measuring unit 19 through a light communication network 29 such as a local area network (LAN). The ID card communication unit 28 is provided in each of the work stations for communication with the ID card attached to the engine compartment when the ID card is placed in the corresponding work station. The host computer 1 is associated with a data memory 7 having first, second, third, fourth, fifth and sixth data files 31, 32, 33, 34, 35 and 36 stored therein. The first data file 31 stores production plan data produced by the host computer 1 based on a production plan transferred from the production control computer 2 equipped in the head office. The production plan data include daily production plans for the vehicle body assembling line 4, as shown in FIG. 3. The second data file 32 stores actual output data transferred from the vehicle body assembling line 4. As shown in FIG. 4, the actual output data include actual outputs each being obtained when the vehicle assembling line 4 operates based on the corresponding one of the daily production plans stored in the first data file 31. The third data file 33 stores working time data transferred from time measuring units (not shown) provided in the respective stations of the vehicle body assembling line 4. The working time data include a time it takes each of the stations to complete the work specified for the station, as shown in FIG. 5. The fourth data file 34 stores quality audit result data transferred from the measuring units 19, 21, 24 and 26. The quality audit result data include quality audit results such as dimension, size and position errors for the respective components, parts and vehicle bodies, as shown in FIG. 6. The fifth data file 35 stores trouble history data recorded for each of the work stations. The trouble history data are a record of successive troubles which have been occurred in the corresponding work station. The trouble history data include the nature of the trouble, the time at which the trouble occurs in a work station, the stoppage time required to restore the work station to remove the trouble, the restoration work to be made in the work station to remove the trouble, and the cause of the trouble for each of the troubles, as shown in FIG. 7. The sixth data file 36 stores measuring unit/work station correspondence data specifying one or more work stations to be checked when the quality audit result data transferred from each of the measuring units 21, 24 and 26 indicate a quality deterioration, as shown in FIG. 8.

The host computer employs the first data file 31 to operate the vehicle body assembling line 4 to produce various kinds of vehicle bodies in a sequence specified by the production plan stored in the first data file 31 while using the data files 32-36 to control the vehicle body quality.

Figure 9:
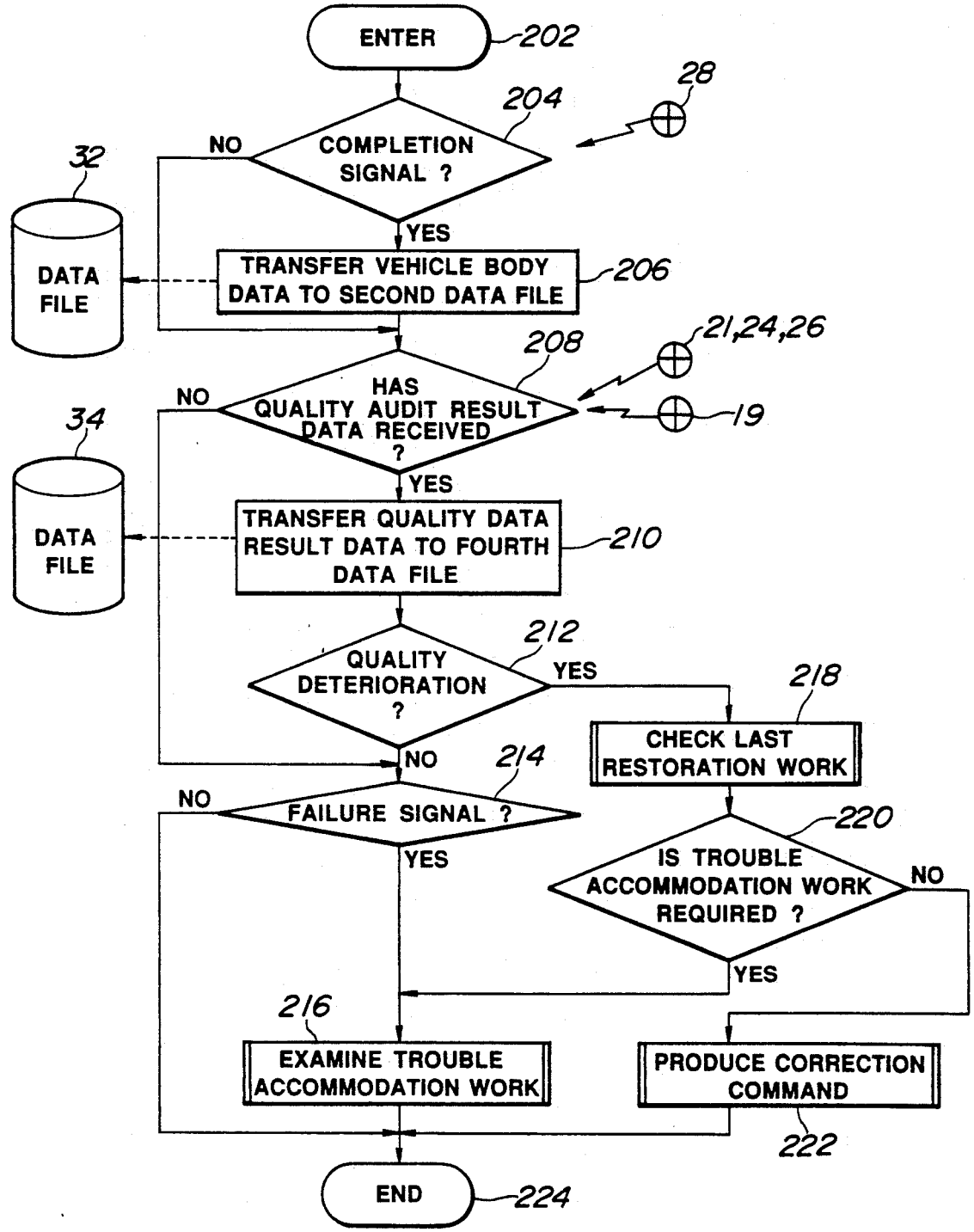
FIG. 9 is an overall flow diagram illustrating the programming of the host computer used in the production line control apparatus.

FIG. 9 is an overall flow diagram illustrating the programming of the digital computer used in the host computer 1. The computer program is entered at the point 202 at uniform intervals of time. At the point 204 in the program, a determination is made as to whether or not a completion signal occurs for one vehicle body. The completion signal is transmitted from the ID card communication unit 28 which communicates through a radio frequency channel with the ID card 22 attached to the engine compartment of the vehicle body when the vehicle body is placed in the output station #60. The completion signal carries assembled vehicle body data including the number specified for the completed vehicle body, the kind (S, B, etc.) of the vehicle to be assembled with the completed vehicle body and the type (sedan, hard-top, etc.) of the vehicle to be assembled with the completed vehicle body. If the answer to the question is "yes", then the program proceeds to the point 206. Otherwise, the program jumps the point 206 to the point 208.

At the point 206 in the program, the host computer 1 transfers the assembled vehicle body data carried on the received completion signal to the second data file 32 to form actual output data as shown in FIG. 4. At the point 208 in the program, a determination is made as to whether or not the host computer 1 has received quality audit result data for the completed vehicle body from the measuring units 19, 21, 24 and 26. If the answer to this question is "yes", then the program proceeds to the point 210 where the received quality audit result data are transferred to the fourth data file 34. Otherwise, the program proceeds to the point 214.

At the point 212 in the program, a determination is made as to whether or not the received quality audit result data indicate at least one quality deterioration; that is, the received quality audit result data includes at least one dimension, shape or position error. If the answer to this question is "yes", then the program proceeds to the point 218. Otherwise, the program proceeds to another determination step at the point 214. This determination is as to whether or not the vehicle body assembling line 4 has at least one work station stopped due to a trouble. This determination is made based on the presence of a failure signal produced from one of the line control unit 27, the assembling units 20, 23 and 25, and the assembling units provided in the other sub-lines which are not shown. The host computer 1 can specify the stopped station based on the measuring unit producing the failure signal. If the answer to this question is "yes", then the program proceeds to the point 216 where the host computer 1 examines a trouble accommodation work required in the specified work station. This step will be described further in connection with the flow diagram of FIG. 11. Otherwise, the program proceeds to the end point 224.

At the point 218 in the program, the host computer 1 examines the last restoration work made in the specified work station. This step will be described further in connection with the flow diagram of FIG. 10. At the point 220 in the program, a determination is made as to whether or not a trouble accommodation work is required. If the answer to this question is "yes", then the program proceeds to the point 216 and then to the end point 224. Otherwise, the program proceeds to the point 222 where the host computer 1 produces a correction command to make an appropriate correction in the specified work station for eliminating the quality deterioration. This step will be described further in connection with the flow diagram of FIG. 15. Following this, the program proceeds to the end point 224.

Figure 10:
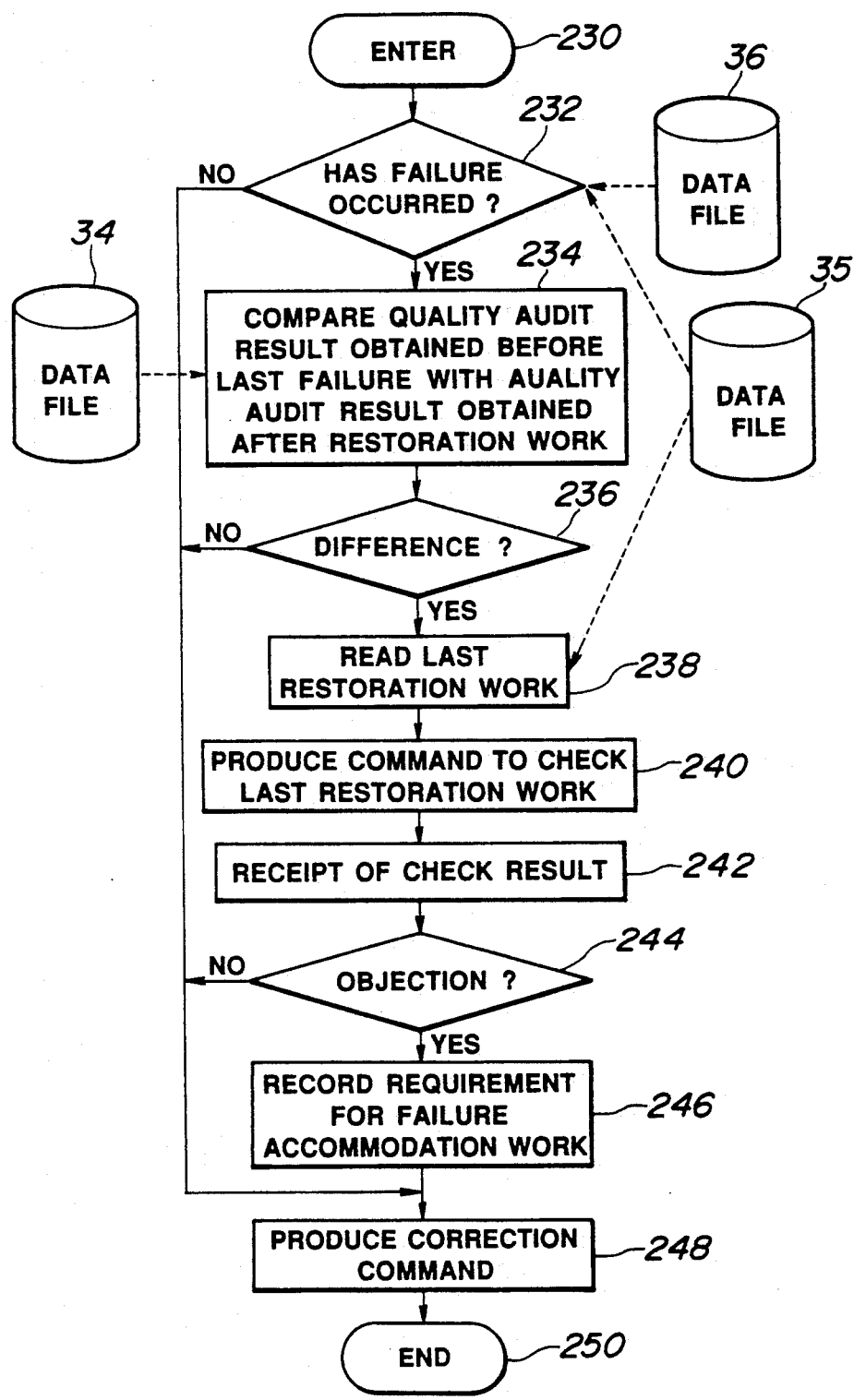
FIG. 10 is a detailed flow diagram illustrating the programming of the host computer as it is used to check a last restoration work made in a specified work station.

FIG. 10 is a flow diagram illustrating the above last restoration work examination made at the point 218 of the flow diagram of FIG. 9. The computer program is entered at the point 230.. At the point 232 in the program, a determination is made as to whether or not a trouble has occurred in the specified work station. For this determination, the host computer 1 refers to the measuring unit/work station correspondence data stored in the sixth data file 36 to specify a work station based on the measuring unit producing the quality audit result data indicating the quality deterioration and then it refers to the trouble history data stored in the fifth data file 35 to determine whether or not a trouble has been recorded for the specified work station. If the answer to this question is "yes", then the program proceeds to the point 234. Otherwise, the program proceeds to the point 248.

At the point 234 in the program, the host computer 1 compares the quality audit result data stored in the fourth data file 34 before the last trouble occurred and the quality audit result data stored in the fourth data file 34 after a restoration work was made to eliminate the last trouble to determine a substantial difference therebetween. At the point 236 in the program, a determination is made as to whether or not a substantial difference exists between the quality audit result data. If the answer to this question is "yes", then the program proceeds to the point 238. Otherwise, the program proceeds to the point 248.

At the point 238 in the program, the host computer 1 refers to the trouble history data stored in the fifth data file 35 to detect the restoration work made in the presence of such a substantially difference for the specified work station. At the point 240 in the program, the host computer 1 produces a command to the specified work station, requiring a check whether the restoration work have been made completely in an appropriate manner. At the point 242 in the program, the host computer 1 awaits the receipt of the result of the check made manually or automatically in the specified work station. After the receipt of this check result, at the point 244 in the program, a determination is made as to whether or not the received check result indicates an objection which would not lead to a trouble causing the specified work station to cease to function. If the answer to this question is "yes", then the program proceeds to the point 246 where a record is made to indicate a requirement for a trouble accommodation work and then to the point 248. If the received check result indicates no objection, then the program proceeds from the point 244 directly to the point 248 where a reminder is provided to the operator in the specified station that an appropriate correction is required to eliminate the dimension, shape or position error. Following this, the program proceeds to the end point 250 which corresponds to the point 220 of the flow diagram of FIG. 9.

Figure 11:
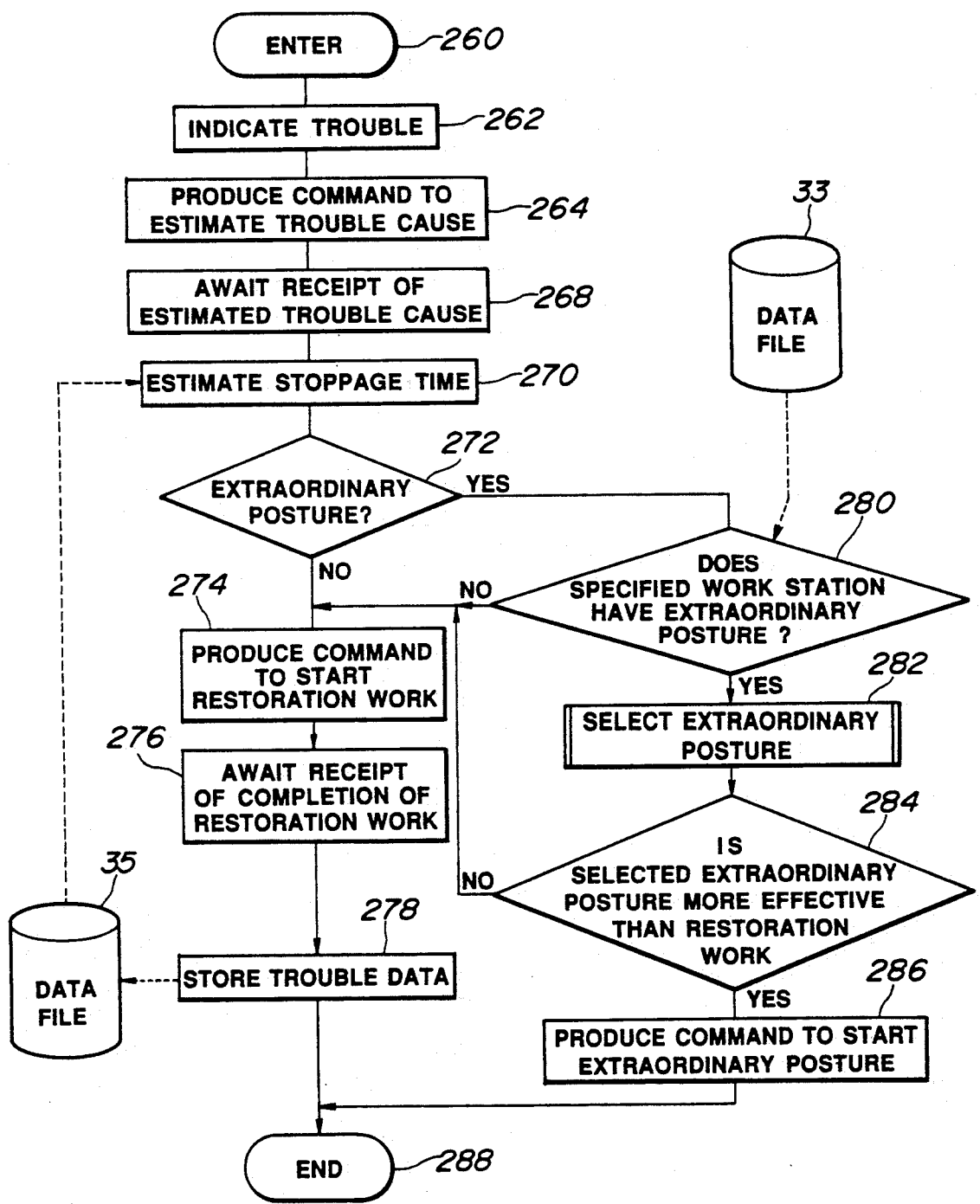
FIG. 11 is a detailed flow diagram illustrating the programming of the host computer as it is used to determine whether the work station is restored or placed in an extraordinary production posture.

FIG. 11 is a flow diagram illustrating the above trouble accommodation work examination made at the point 216 of the flow diagram of FIG. 9. The computer program is entered at the point 260. At the point 262 in the program, the host computer 1 provides a reminder to the operator in the specified work station that a trouble is present. At the point 264 in the program, a command is produced to the specified work station, requiring an estimation of the cause of the trouble. This estimation will be described in greater detail in connection with the flow diagram of FIG. 12. At the point 268 in the program, the host computer 1 awaits the receipt of an estimated cause indication signal from the specified work station. After the receipt of the estimated cause indication signal, at the point 270, the host computer 1 estimates the stoppage time it may take to complete a restoration work required in the specified work station based on the trouble history data stored in the fifth data file 35. For example, the trouble history data of FIG. 7 define the estimated stoppage time as 20 minutes when the trouble occurs in a positioning robot BL3 used in the tack welding station #30 because of overload application, 10 minutes when the trouble occurs in a positioning robot BL2 used in the tack welding station #30 because of servo amplifier damage, and 120 minutes when the trouble occurs in a positioning robot BL1 used in the tack welding station #30 because of ball screw damage. At the point 272 in the program, a determination is made as to whether or not an extraordinary production posture is required for the specified work station. This determination is made based on a comparison of the estimated stoppage time with a predetermined value, for example, 30 minutes, and also the number of repetitions of the same kinds of troubles which have occurred in the specified work station. If the answer to this question is "no", then it means that the estimated stoppage time is less than the predetermined value or the trouble repetition number is less than a predetermined value and the program proceeds to the point 274.

At the point 274 in the program, the host computer 1 produces a command to start the restoration work required in the specified work station. At the point 276 in the program, the host computer 1 awaits the receipt of a restoration work completion signal transferred from the specified work station. The restoration work completion indication signal includes trouble data to be stored in the trouble history data file 35. After the receipt of the restoration work completion signal, at the point 278, the transferred trouble data are stored in the trouble history data file 35. Following this, the program proceeds to the end point 288 which corresponds to the end point 224 of the flow diagram of FIG. 9.

If the answer to the question inputted at the point 272 is "yes", then it means that the estimated stoppage time exceeds the predetermined value or the trouble repetition number exceeds the predetermined value and the program proceeds to the another determination step at the point 280. This determination is as to whether or not the specified work station can be placed in an extraordinary production posture. This determination is made based on the working time data stored in the third data file 33. For example, the working time data of FIG. 5 define the fact that the tack welding station #30 can operate in a slow-speed mode if the damaged servo motor can be used in the slow-speed mode and can be replaced with a substitute tack welding station which is normally provided out of the main line 18. Accordingly, the tack welding station #30 can be placed in a first extraordinary production posture where it operates in the slow-down mode and in a second extraordinary production posture where it is replaced with the substitute tack welding station. The working time data also define the fact that each of the stations #10 and #20 cannot be placed in an extraordinary production posture. It should be understood, of course, that other extraordinary production postures may be taken. For example, the specified work station may be placed in another extraordinary production posture by shifting the operators from the specified work station to one or more work stations located upstream of the specified work station while the specified work station is restored or by replacing the specified work station with a similar work station provided for automotive vehicles of another type or kind. In addition, substitute work stations may be provided for the respective work stations #10 and #20. If the answer to this question is "yes", then the program proceeds to the point 282. Otherwise, the program proceeds to the point 274.

At the point 282 in the program, the host computer 1 selects one of the extraordinary production postures. This step will be described further in connection with the flow diagram of FIG. 13. At the point 284 in the program, a determination is made as to whether or not the selected extraordinary production posture provides a better production efficiency than obtained by the restoration work. This determination is made by a comparison of an output obtained when the specified work station is restored and an output obtained when the work station operates in the selected extraordinary production posture. Preferably, the outputs are weighted based on various factors including the number of steps required to restore the line after the production plan for an upstream line is changed. If the answer to this question is "yes", then the program proceeds to the point 286. Otherwise, the program proceeds to the point 274.

At the point 286 in the program, the host computer 1 produces a command causing the specified work station to be placed in the selected extraordinary production posture. Following this, the program proceeds to the end point 288.

Figure 12:
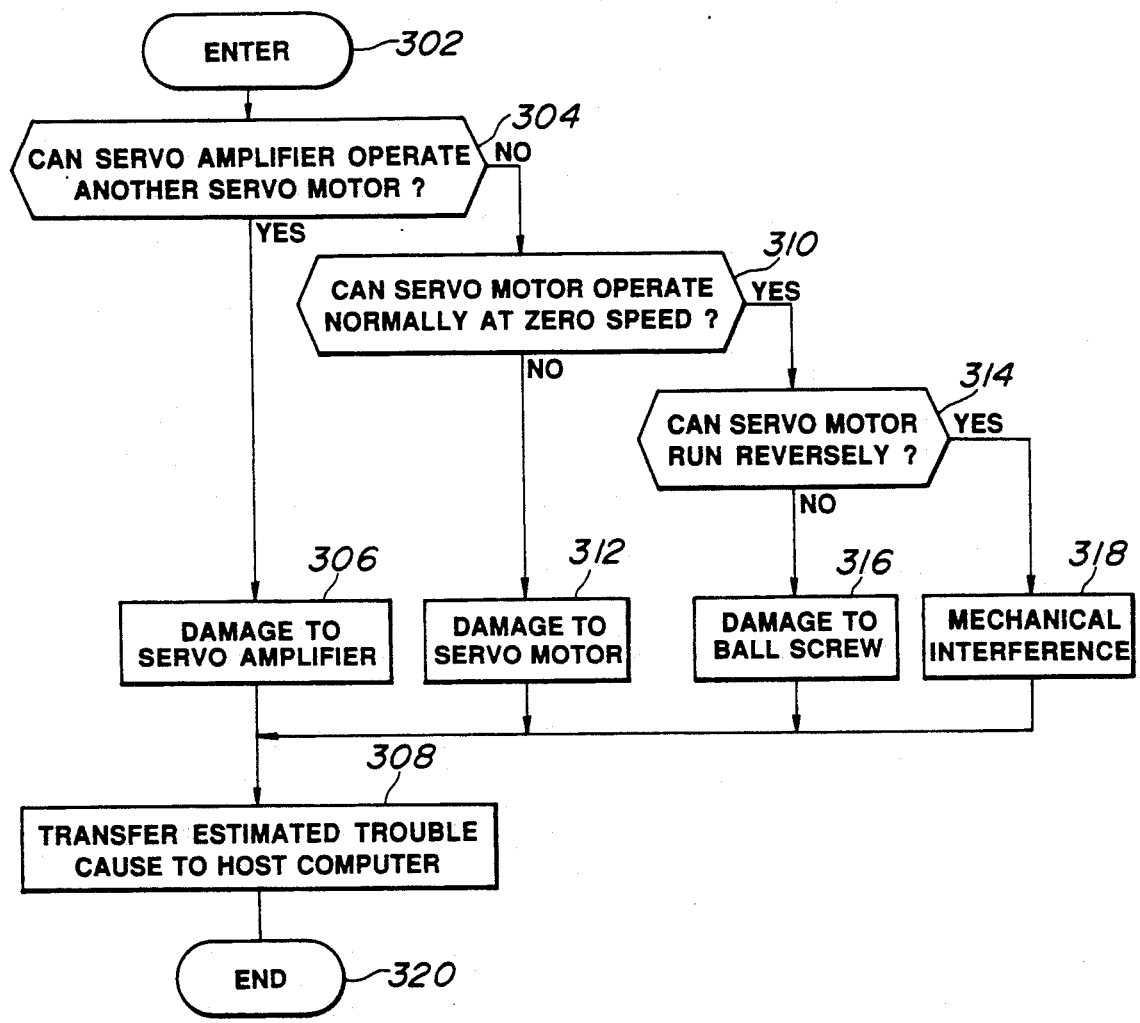
FIG. 12 is a flow diagram illustrating the programming of the digital computer used in a work station as it is used to check a cause of a trouble occurred in the work station.

FIG. 12 is a flow diagram illustrating the cause estimation made in the computer used in the specified work station. It is now assumed that a motor overheat indication signal is produced from a servo amplifier connected to a servo motor provided for driving a manipulator arm axes.

The computer program is entered at the point 302 upon the receipt of the cause estimation command produced from the host computer 1 at the point 262 of the flow diagram of FIG. 11. At the point 304 in the program, a determination is made as to whether or not the servo amplifier produces a motor overheat indication signal when it is connected to another servo motor provided for driving another manipulator arm axes. If the answer to this question is "yes", then the program proceeds to the point 306 where it is decided that the failure is caused by damage to the servo amplifier. The program proceeds from the point 306 to the point 308 where an estimated cause indication signal is produced to the host computer 1. In this case, the estimated cause indication signal includes such an information that the failure is caused by damage to the servo amplifier. Following this, the program proceeds to the end point 320.

If the answer to the question inputted at the point 304 is "no", then it means that there is no problem in the servo amplifier and the program proceeds to another determination step at the point 310. This determination is as to whether or not the servo motor operates normally when it is controlled to stop from rotating. This determination is made based on the measurement of the holding current and the encoder output signal produced when the the servo motor is controlled to stop from rotating. If the answer to this question is "no", then the program proceeds to the point 312 where it is decided that the failure is caused by damage to the servo motor. The program proceeds from the point 312 to the point 308 where an estimated cause indication signal is produced to the host computer 1. In this case, the estimate cause indication signal includes such an information that the failure is caused by damage to the servo motor.

If the answer to the question inputted at the point 310 is "yes", it means that the servo motor is normal and the program proceeds to another determination step at the point 314. This determination is as to whether or not the servo motor can rotate in the reverse direction. If the answer to this question is "no", then the program proceeds to the point 315 where it is decided that the failure is caused by damage to the ball screw. The program proceeds from the point 316 to the point 308 where an estimated cause indication is produced to the host computer 1. In this case, the estimated cause indication signal includes such an information that the failure is caused by ball screw damage.

If the answer to the question inputted at the point 314 is "yes", then the program proceeds to the point 318 where it is decided that the failure is caused by mechanical interference with the work. The program proceeds from the point 318 to the point 308 where an estimated cause indication signal is produced to the host computer 1. In this case, the estimated cause indication signal includes such an information that the failure is caused by mechanical interference.

Figure 13:
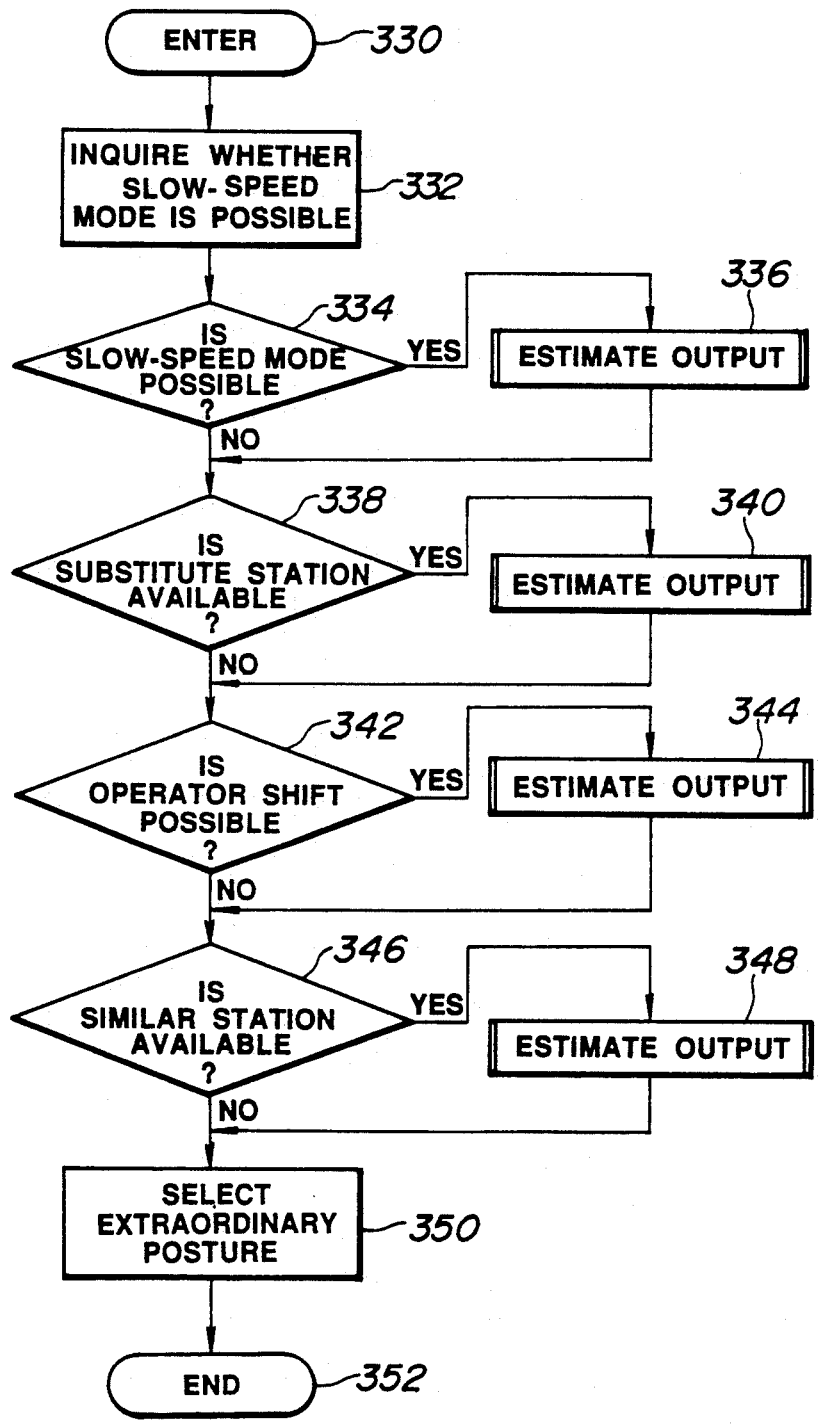
FIG. 13 is a detailed flow diagram illustrating the programming of the host computer as it is used to select one of extraordinary production postures.

FIG. 13 is a flow diagram illustrating the above extraordinary production posture selection made at the point 282 of the flow diagram of FIG. 11. The computer program is entered at the point 330. At the point 332 in the program, the host computer 1 inquires to the the specified work station whether the specified work station can operate in the slow-speed mode. At the point 334 in the program, a determination is made as to whether or not the specified work station can operate in the slow-speed mode. This determination is made based on the answer to the inquiry. If the answer to this question is "yes", then the program proceeds to the point 336. Otherwise, the program proceeds to the point 338.

At the point 336 in the program, a simulation is made to estimate the output obtained in the vehicle body assembling line 4 when the station station operates in the slow-speed mode. This simulation will be described further in connection with the flow diagram of FIG. 14. After the estimated output is stored in the computer memory, the program proceeds from the point 336 to the point 338.

At the point 338 in the program, a determination is made as to whether or not the specified work station can be replaced with a substitute work station. This determination is made based on the working time data stored in the third data file 33, as described in connection with the point 284 of FIG. 11. If the answer to this question is "yes", then the program proceeds to the point 340. Otherwise, the program proceeds to the point 342. At the point 340 in the program, a simulation is made to estimate the output obtained in the vehicle body assembling line 4 when the substitute work station is used in place of the specified work station. This simulation will be described further in connection with the flow diagram of FIG. 14. After the estimated output is stored in the computer memory, the program proceeds from the point 340 to the point 342.

At the point 342 in the program, a determination is made as to whether or not it is possible to shift the operators from the specified work station to one or more work stations located upstream of the specified work station while the specified work station is restored. If the answer to this question is "yes", then the program proceeds to the point 344. Otherwise, the program proceeds to the point 346. At the point 344 in the program, a simulation is made to estimate the output obtained in the vehicle body assembling line 4 when the operators are shifted from the specified work station to one or more upstream work stations. After the estimated output is stored in the computer memory, the program proceeds to the point 346.

At the point 346 in the program, a determination is made as to whether or not it is possible to replace the specified work station with a similar work station provided for automotive vehicles of another type or kind. If the answer to this question is "yes", then the program proceeds to the point 348. Otherwise, the program proceeds to the point 350. At the point 348 in the program, a simulation is made to estimate the output obtained in the vehicle body assembling line 4 when the similar work station is used in place of the specified work station. After the estimated output is stored in the computer memory, the program proceeds to the point 350.

At the point 350 in the program, the best extraordinary production posture is selected by a comparison of the outputs stored at the points 336, 340, 344 and 348. Following this, the program proceeds to the end point 352 which corresponds to the point 284 of the flow diagram of FIG. 11.

Figure 14:
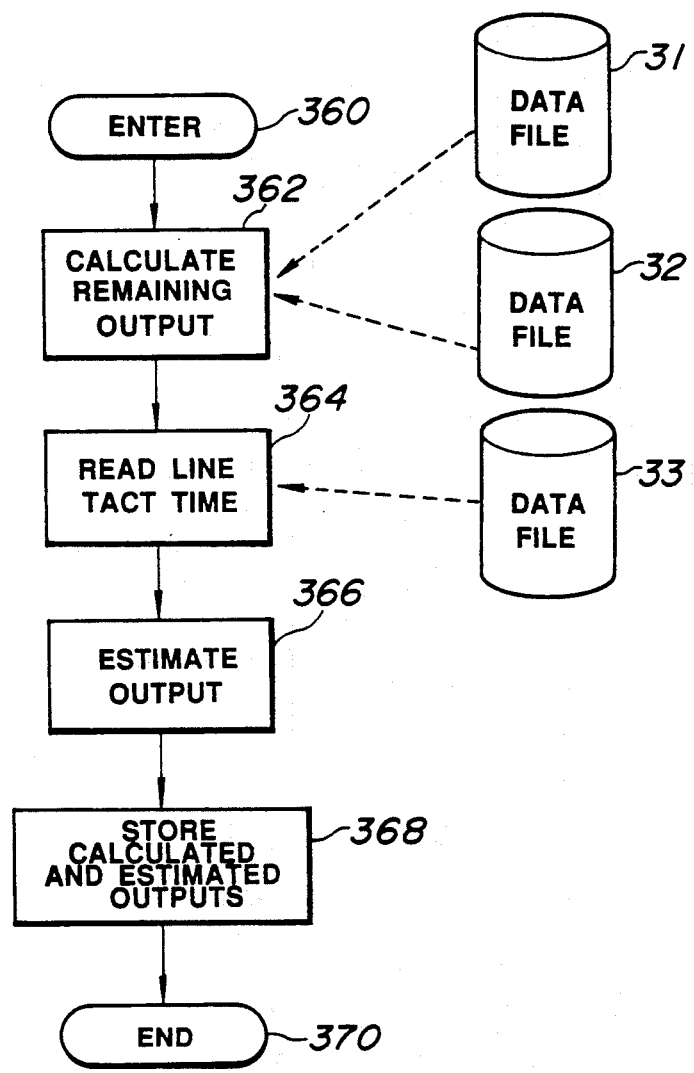
FIG. 14 is a detailed flow diagram illustrating the programming of the host computer as it is used to estimate an output obtained when the work station is placed in one of the extraordinary production postures.

FIG. 14 is a flow diagram illustrating the above simulation made at the point 336 or 340 of the flow diagram of FIG. 13. The computer program is entered at the point 360. At the point 362 in the program, the host computer 1 calculates the remaining output by subtracting the actual output obtained before the trouble occurs from the planned output specified for the day. The planned output is obtained based on the daily production plan data stored in the first data file 31. The actual output is obtained based on the actual output data stored in the second data file 32. At the point 364 in the program, the host computer 1 refers to the working time data stored in the third data file 33 to read the line tact time specified when the work station to be simulated is placed in the specified extraordinary production posture. At the point 366 in the program, the host computer 1 simulates or calculates an output obtained if the specified work station operates continuously with the read line tact time. At the point 368 in the program, the simulated output and the remaining output are recorded. Following this, the program proceeds to the end point 370.

FIG. 15 is a flow diagram illustrating the above correction command production made at the point 222 of the flow diagram of FIG. 9. The computer program is entered at the point 380. At the point 382 in the program, the host computer 1 refers to the quality audit data stored in the fourth data file 34 to determine the dimension, shape and/or position error causing the quality deterioration in the specified work. At the point 384 in the program, a determination is made as to whether the determined error is within an acceptable range. If the answer to this question is "yes", then the program proceeds to the point 390. Otherwise, the program proceeds to the point 394.

At the point 390 in the program, the host computer 1 calculates a correction factor to be used in the specified work station for changing the position of the positioning tool to eliminate the determined error. This calculation is made based on the quality audit data and the CAD data. At the point 392 in the program, the calculated correction factor is produced to the specified work station. Following this, the program proceeds to the end point 398 which corresponds to the end point 224 of the flow diagram of FIG. 9.

At the point 394 in the program, the host computer 1 calculates correction factors to be used in the work stations located upstream of the specified work stations for changing the positions of the positioning tools to eliminate the determined error. This calculation is made based on the quality audit data and the CAD data. At the point 396 in the program, the calculated correction factors are produced to the respective upstream work stations. Following this, the program proceeds to the end point 398.

Although the invention has been described in connection with a vehicle body assembling line 4, it should be understood that similar controls are applicable to the pressing line 3, the painting line 5 and the vehicle assembling line 4. It should also be understood that the principles and approaches of the invention are applicable to other production lines.

What is claimed is:

1. A method of controlling a production line including at least one work station operable in one of a normal production posture and at least one extraordinary production posture for producing products, and a checking station located downstream of the work station for making a quality check to provide a quality audit result for each of the products transferred in succession from the work station, the method comprising the steps of:
   accumulating trouble data provided in succession for respective troubles which have occurred in the work station to provide trouble history data specifying each of the troubles in relation to a nature of the corresponding trouble, a cause of the corresponding trouble, and a stoppage time required to restore the work station so as to remove the corresponding trouble;
   producing a failure when the work station ceases to function due to a trouble, the failure signal indicating detected nature and cause of the trouble;
   referring to the trouble history data to estimate a stoppage time based on the detected trouble nature and cause in response to the failure signal;
   producing a first command to restore the work station when the estimated stoppage time is less than a predetermined time;
   producing a second command to place the work station into the extraordinary production posture when the estimated stoppage time exceeds the predetermined value;
   providing production efficiency data specifying a production efficiency obtained when the work station operates in the extraordinary production posture;
   referring to the production efficiency data to estimate a first production efficiency to be obtained when the work station operates in the extraordinary production posture;
   estimating a second production efficiency to be obtained when the work station is restored; and
   producing the first command when the first production efficiency is less than the second production efficiency.

2. The method as claimed in claim 1, further comprising the steps of measuring a stoppage time actually required to restore the work station so as to remove the trouble.

3. The method as claimed in claim 2, further comprising the steps of adding trouble data including the detected trouble nature and cause and the measured stoppage time to the trouble history data.

4. The method as claimed in claim 3, further comprising the steps of referring to the trouble history data to detect a number in which the trouble of the same nature repeats, and producing the first command regardless of the estimated stoppage time when the detected number exceeds a predetermined value.

5. The method as claimed in claim 1, wherein the work station is operable in a plurality of extraordinary production postures.

6. The method as claimed in claim 5, further comprising the step of providing production efficiency data specifying production efficiencies each obtained when the work station operates in the corresponding one of the extraordinary production postures.

7. The method as claimed in claim 6, further comprising the step of selecting one of the extraordinary production postures based on the production efficiency data.

8. The method as claimed in claim 7, further comprising the steps of estimating a first production efficiency to be obtained when the work station operates in the selected extraordinary production posture based on the production efficiency data, estimating a second production efficiency to be obtained when the work station is restored, and producing the first command when the first production efficiency is less than the second production efficiency.

9. The method as claimed in claim 1, further comprising the steps of accumulating the quality audit results provided for the respective products to provide quality audit result data.

10. The method as claimed in claim 9, further comprising the steps of producing a correction command when the quality audit result indicates a quality deterioration, and making a correction in the work station in response to the correction command.

11. The method as claimed in claim 10, further comprising the step of adding the quality audit result to the trouble history data.

12. The method as claimed in claim 11, further comprising the steps of referring to the trouble history data to detect a last trouble occurred in the work station, referring to the quality audit result data to detect a first quality audit result obtained before the last trouble occurred and a second quality audit result obtained after the work station was restored to remove the last trouble, and producing the first command when the second quality audit result indicates a greater quality deterioration than indicated by the first quality audit result.

13. The method as claimed in claim 11, further comprising the steps of referring to trouble history data to detect a last trouble occurred in the work station, referring to the quality audit result data to detect a first quality audit result before the last trouble occurred and a second quality audit result obtained after the work station was restored to eliminate the last trouble, and producing a command to check whether the work station has been restored completely when a substantial difference exists between the first and second quality audit results.

14. An apparatus for controlling a production line including at least one work station operable in one of a normal production posture and at least one extraordinary production posture for producing products, and a checking station located downstream of the work station for making a quality check to provide a quality audit result for each of the products transferred in succession from the work station, the apparatus comprising:

means for accumulating trouble data provided in succession for respective troubles which have occurred in the work station to provide trouble history data specifying each of the troubles in relation to a nature of the corresponding trouble, a cause of the corresponding trouble, and a stoppage time required to restore the work station so as to remove the corresponding trouble;

means for producing a failure signal when the work station ceases to function due to a trouble, the failure signal indicating detected nature and cause of the trouble; and a control unit including means responsive to the failure signal for referring to the trouble history data to estimate a stoppage time based on the detected trouble nature and cause, means for producing a first command to restore the work station when the estimated stoppage time is less than a predetermined time, means for producing a second command to place the work station into the extraordinary production posture when the estimated stoppage time exceeds the predetermined value, means for providing production efficiency data specifying a production efficiency obtained when the work station operates in the extraordinary production posture, means for referring to the production efficiency data to estimate a first production efficiency to be obtained when the work station operates in the extraordinary production posture, means for estimating a second production efficiency to be obtained when the work station is restored, and means for producing the first command when the first production efficiency is less than the second production efficiency.

15. The apparatus as claimed in claim 14, further comprising means for measuring a stoppage time actually required to restore the work station so as to remove the trouble.

16. The apparatus as claimed in claim 15, wherein the control unit includes means for adding trouble data including the detected trouble nature and cause and the measured stoppage time to the trouble history data.

17. The apparatus as claimed in claim 16, wherein the control unit includes means for referring to the trouble history data to detect a number in which the trouble of the same nature repeats, and means for producing the first command regardless of the estimated stoppage time when the detected number exceeds a predetermined value.

18. The apparatus as claimed in claim 14, wherein the work station is operable in a plurality of extraordinary production postures.

19. The apparatus as claimed in claim 18, further comprising means for providing production efficiency data specifying production efficiencies each obtained when the work station operates in the corresponding one of the extraordinary production postures.

20. The apparatus as claimed in claim 19, wherein the control unit includes means for selecting one of the extraordinary production postures based on the production efficiency data.

21. The apparatus as claimed in claim 20, wherein the control unit includes means for estimating a first production efficiency to be obtained when the work station operates in the selected extraordinary production posture based on the production efficiency data, means for estimating a second production efficiency to be obtained when the work station is restored, and means for producing the first command when the first production efficiency is less than the second production efficiency.

22. The apparatus as claimed in claim 14, further comprising means for accumulating the quality audit results provided for the respective products to provide quality audit result data.

23. The apparatus as claimed in claim 22, wherein the control unit includes means for producing a correction command when the quality audit result indicates a quality deterioration, and means responsive to the correction command for making a correction in the work station.

24. The apparatus as claimed in claim 23, wherein the control unit includes means for adding the quality audit result to the trouble history data.

25. The apparatus as claimed in claim 24, wherein the control unit includes means for referring to the trouble history data to detect a last trouble occurred in the work station, means for referring to the quality audit result data to detects a first quality audit result obtained before the last trouble occurred and a second quality audit result obtained after the work station is restored to remove the last trouble, and means for producing the first command when the second quality audit result indicates a greater quality deterioration than indicated by the first quality audit result.

26. The apparatus as claimed in claim 24, wherein the control unit includes means for referring to the trouble history data to detect a last trouble occurred in the work station, means for referring to the quality audit result data to detect a first quality audit result obtained before the last trouble occurred and a second quality audit result obtained after the work station was restored, and means for producing a command to check whether the work station was restored completely when a substantial difference exists between the first and second quality audit results.

* * * * *